(12) United States Patent
Cole

(10) Patent No.: US 6,335,654 B1
(45) Date of Patent: Jan. 1, 2002

(54) INRUSH CURRENT CONTROL CIRCUIT

(75) Inventor: Steven W. Cole, Covina, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/528,800

(22) Filed: Mar. 17, 2000

(51) Int. Cl.⁷ .................................................. G05F 3/02
(52) U.S. Cl. ....................... 327/546; 327/427; 323/273; 323/299
(58) Field of Search ................................ 327/419, 427, 327/432, 433, 434, 143, 398, 399, 546, 545; 323/273, 274, 275, 299

(56) References Cited

U.S. PATENT DOCUMENTS

| | | | |
|---|---|---|---|
| 3,705,342 A | * 12/1972 | Dalke | 323/22 |
| 3,916,294 A | * 10/1975 | Kennedy | 323/22 |
| 4,445,055 A | * 4/1984 | Bete | 327/434 |
| 4,890,021 A | * 12/1989 | Walker | 327/398 |
| 5,087,871 A | 2/1992 | Losel | 323/299 |
| 5,122,724 A | 6/1992 | Criss | 323/222 |
| 5,155,648 A | 10/1992 | Gauthier | 361/58 |
| 5,287,263 A | 2/1994 | Shilo | 363/143 |
| 5,374,887 A | 12/1994 | Drobnik | 323/299 |
| 5,559,660 A | 9/1996 | Watson et al. | 361/58 |
| 5,619,127 A | 4/1997 | Warizaya | 323/275 |
| 5,703,769 A | 12/1997 | Murray | 363/50 |
| 5,764,926 A | 6/1998 | Fukuda et al. | 395/283 |
| 5,822,203 A | 10/1998 | Peron | 363/125 |
| 5,834,924 A | 11/1998 | Konopka et al. | 323/222 |
| 5,886,431 A | 3/1999 | Rutigliano | 307/131 |
| 5,886,892 A | 3/1999 | Radley et al. | 363/126 |

* cited by examiner

Primary Examiner—Terry D. Cunningham
Assistant Examiner—Quan Tra
(74) Attorney, Agent, or Firm—John H. Kusmiss

(57) ABSTRACT

An inrush current control circuit having an input terminal connected to a DC power supply and an output terminal connected to a load capacitor limits the inrush current that charges up the load capacitor during power up of a system. When the DC power supply applies a DC voltage to the input terminal, the inrush current control circuit produces a voltage ramp at the load capacitor instead of an abrupt DC voltage. The voltage ramp results in a constant low level current to charge up the load capacitor, greatly reducing the current drain on the DC power supply.

6 Claims, 3 Drawing Sheets

INRUSH CURRENT CONTROL CIRCUIT

ORIGIN OF THE INVENTION

The invention described herein was made in performance for work under NASA contract, and is subject to the provisions of Public Law 96-517 (35 U.S.C. § 202) in which the Contractor has elected not to retain title.

TECHNICAL FIELD

The present invention generally relates to inrush current protection circuits and more particularly, pertains to an inrush current control circuit for limiting the inrush current from a DC voltage supply to a load capacitor.

BACKGROUND ART

Many flight instruments and military equipment commonly employ capacitors on a power buss to filter out current spikes and noise that would otherwise be impressed on the power buss. During power-up, these capacitors initially require large amounts of current to charge up, resulting in a large inrush current drain on the power buss. This can cause disruption of other instruments and equipment connected to the power buss.

For example, aircraft that distribute DC power from a generator to on-board systems protect the generator from excessive current loading with a circuit breaker. During power-up of an on-board system, capacitors in the on-board system draw large amounts of current to charge up. If the capacitors of the on-board system attempt to draw more current from the generator than that allowed by the circuit breaker, then the circuit breaker will activate and terminate DC power to all the on-board systems connected to the generator.

Also, spacecraft in earth orbit use solar cells to provide power to internal systems. The amount of current provided by the solar cells is limited by the amount of light falling on the cells. If the capacitors of an internal system attempt to draw more current from the solar cells than they can supply, then the output voltage of the solar cells will drop sharply. The sharp drop in the output voltage can cause disruption of other systems drawing power from the solar cells.

Therefore, there is a need to protect against large current drains on a power source during system power-up and the disruption of other systems connected to the power source. Specifically, a protection circuit is needed between the power source and each system with a capacitive load drawing power from the power source to limit the inrush current during system power-up.

STATEMENT OF THE INVENTION

The inrush current control circuit of the present invention addresses the above problem by limiting the inrush current drawn from a DC power source during system power-up. An input terminal of the inrush current control circuit is connected to a DC power supply and an output terminal is connected to the load capacitor of a system. When the DC power supply applies a DC voltage to the input terminal, the inrush current control circuit of the present invention produces a voltage ramp at the load capacitor instead of an abrupt DC voltage. The voltage ramp results in a constant low level current to charge up the load capacitor compared to an abrupt DC voltage which can result in a high level current.

BRIEF DESCRIPTION OF THE DRAWINGS

The exact nature of this invention will be readily apparent from consideration of the following detailed description in conjunction with the accompanying drawings, wherein.

DETAILED DESCRIPTION OF THE INVENTION

The following description is provided to enable any person skilled in the art to make and use the invention and sets forth the best modes contemplated by the inventor of carrying out his invention.

Figure 1:
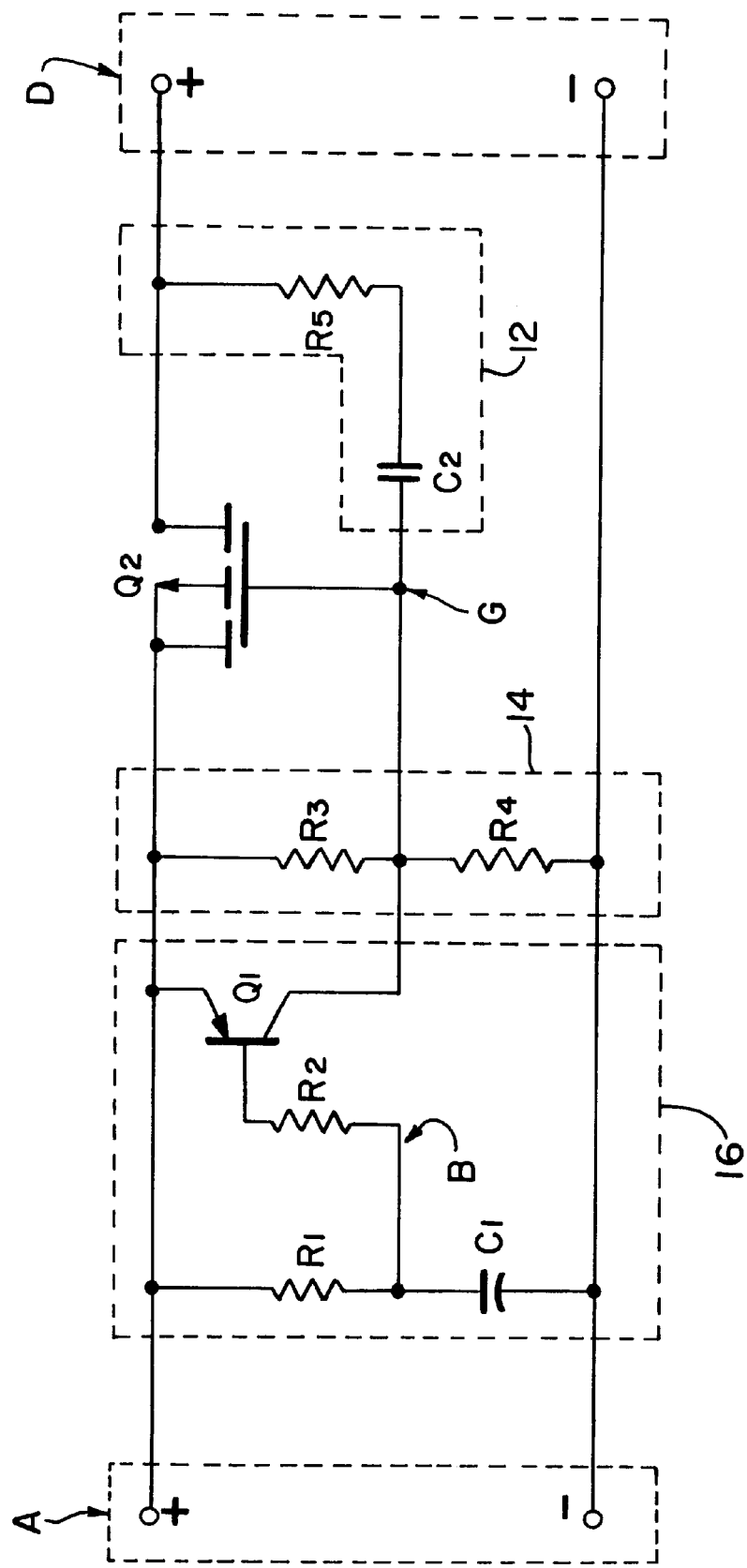
FIG. 1 is a schematic diagram of the inrush current control circuit of the present invention.

The inrush current control circuit of the preferred embodiment of the invention is shown in FIG. 1. The inrush current control circuit includes an input terminal A connected to a DC voltage power supply (not shown) and an output terminal D connected to a load capacitor (not shown). A P-type field effect transistor (PFET) Q2 connected between the positive lead of the input terminal A and output terminal D limits the current flow between the input and output terminal. A gate control circuit 12 connected between a gate terminal G of PFET Q2 and the positive lead of the output terminal D controls the gate G potential of PFET Q2. The gate control circuit 12 consist of a capacitor C2 and a resistor R5 connected in series. A voltage divider 14 connected between the positive and negative lead of the input terminal A and to the gate G of the PFET Q2 sets the steady state gate G potential of PFET Q2. The voltage divider 14 consist of two resistors R3 and R4 connected in series. A charging circuit 16 connected between the positive and negative lead of the input terminal A and to the gate G of PFET Q2 charges up capacitor C2 when a DC voltage is applied to the input terminal A. The charging circuit 16 includes a transistor Q1 and a resistor-capacitor (RC) circuit consisting of two resistors R1 and R2 and a capacitor C1. The resistor R1 is coupled between the positive lead and a junction formed by the union of one side of the capacitor C1 and one side of the resistor R2. The second side of the capacitor C1 is coupled to the negative lead while the second side of the resistor R2 is coupled to the base terminal of the transistor Q1.

Figure 2A:
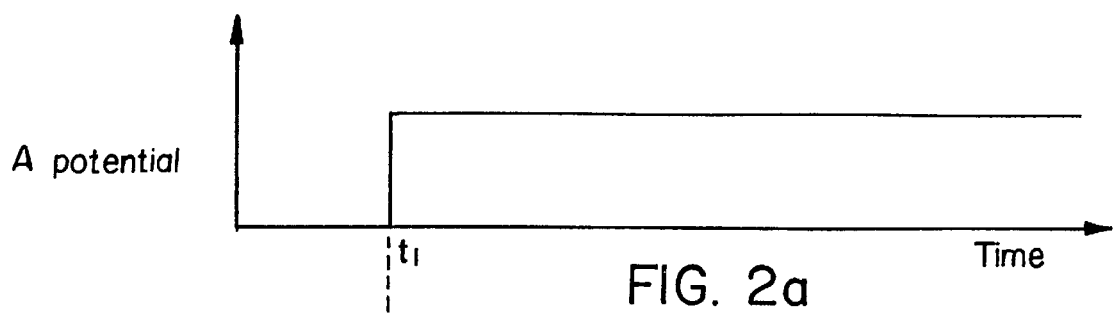
FIGS. 2a, 2b, 2c, and 2d are graphs showing four potentials of the inrush current control circuit versus time when a DC voltage is applied to the input terminal.
Figure 2B:
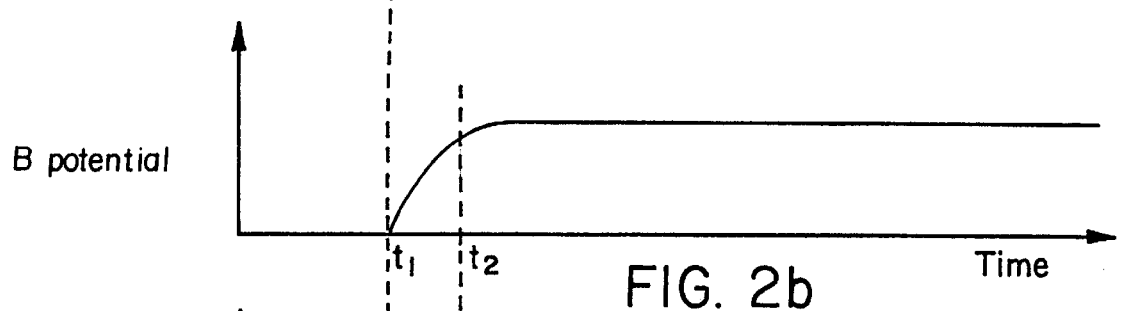
Figure 2C:
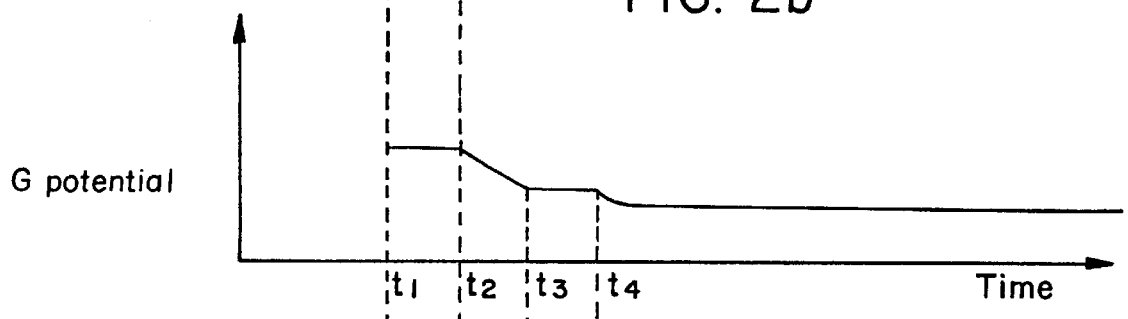
Figure 2D:
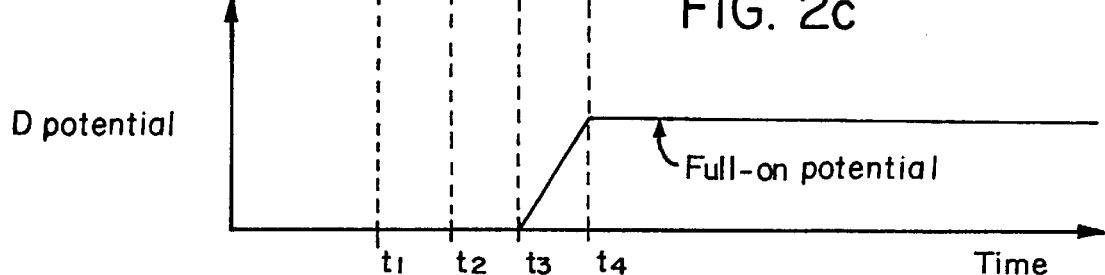

The operation of the inrush current control circuit will now be described. FIGS. 2a, 2b, 2c and 2d shows four potentials of the inrush current control circuit versus time when a DC voltage is applied to the input terminal A. FIG. 2a shows the input terminal A potential, FIG. 2b shows a base terminal B potential of transistor Q1, FIG. 2c shows the gate G potential of PFET Q2, and FIG. 2d shows the output terminal D potential. All potentials are with respect to ground. It is assumed that all capacitors are initially discharged. When an input DC voltage Vin is applied to the input terminal A at time $t_1$, the input terminal A potential abruptly rises to Vin and transistor Q1 turns on, providing a conduction path between the positive lead of the input terminal A and capacitor C2 to quickly charge up capacitor C2. As capacitor C2 charges up, the gate G potential of PFET Q2 quickly rises to a level close to Vin turning PFET Q2 off. At time $t_2$, capacitor C1 has charged up, raising the base B potential to a level close to Vin. This causes transistor Q1 to turn off, allowing capacitor C2 to slowly discharge. As capacitor C2 discharges, the gate potential of PFET Q2 drops. At time $t_3$, the gate to source turn-on potential of PFET Q2 is reached and current begins to flow through PFET Q2. At this point, the output terminal potential D begins to rise in a linear ramp. Between times $t_3$ and $t_4$, the gate G potential of PFET Q2 remains almost constant as capacitor C2 continues to discharge and the output D potential rises in a linear ramp. The rate of voltage rise at the output D is limited by the discharge rate of capacitor C2 through R4, R5 and the load resistance (typically very small). The inrush current is limited by the rate of rise of the voltage at the output D and the value of the load capacitance. The value of the inrush current, I, during this period can be determined by the formula:

$$I = C\, dV/dT$$

where C is the load capacitance and dV is the change in voltage at the output D in volts per second (dT). At time $t_4$, the voltage ramp reaches the input potential minus the voltage drop across the PFET Q2. This potential is the full-on potential. After the full-on potential is reached, capacitor C2 continues to discharge until the gate G potential drops to a steady state level determined by the voltage divider 14 formed by R3 and R4. The primary function of R5 is to suppress oscillations in PFET Q2.

Component values and part numbers for an inrush current control circuit according to the present invention are as follows:

| Resistor Values | | | | | |
|---|---|---|---|---|---|
| R1: | 47 KΩ | R2: | 33 KΩ | R3: | 47 KΩ |
| R4: | 33 KΩ | R5: | 470 Ω | | |
| Capacitor Values | | | | | |
| C1: | 0.1 μf | C2: | 0.1 μf | | |
| Part Numbers | | | | | |
| Q1: | 2N3251A | Q2: | IRFP9130 | | |

The above inrush current control circuit is connected to a DC voltage supply of 24V and charges a load capacitance of a few hundred thousand microfarads in a ramp time of a few tens of microseconds.

Figure 3:
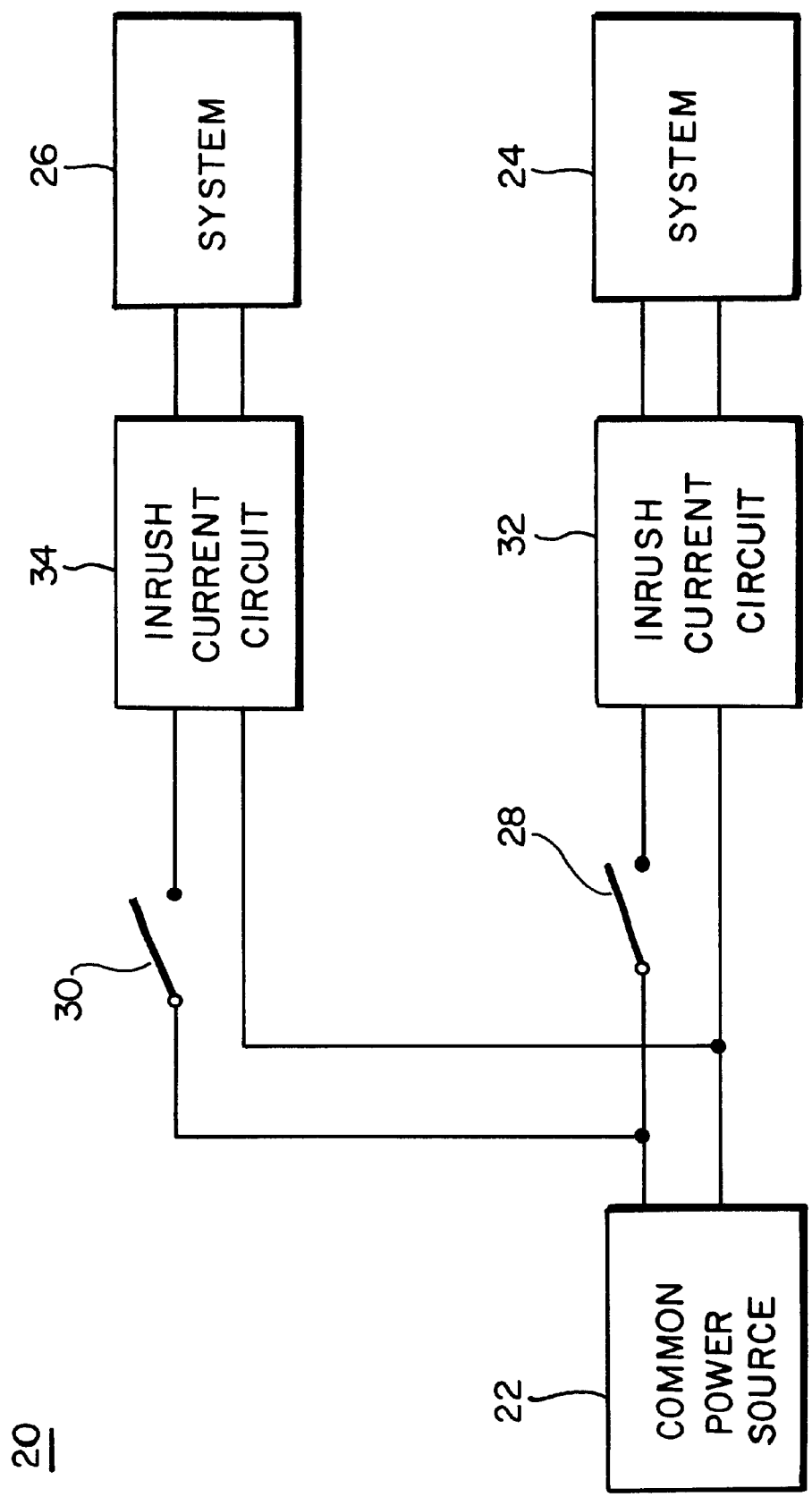
FIG. 3 is a block diagram of a power distribution network utilizing the inrush current control circuit of the present invention.

The inrush current control circuit can be used in a power distribution system having various systems connected to a common power source, such as on-board aircraft systems connected to a common generator. In this case, each system requiring inrush current protection is connected to the common power source through its own inrush current control circuit. FIG. 3 shows an example of a power distribution network 20 having two systems 24, 26 connected to a common power source 22. Each system is connected to the common power source 22 through a switch 28, 30 and an inrush current control circuit 32, 34 according to the present invention. The system 24, 26 is turned on by closing the switch 28, 30 connecting the system to the common power source 22.

Those skilled in the art will appreciate that various adaptations and modifications of the just-described preferred embodiment of the invention can be configured without departing from the scope and spirit of the invention. Therefore, it is to be understood that, within the scope of the appended claims, the invention may be practiced other than as specifically described herein.

What is claimed is:

1. An inrush current control circuit for producing a voltage ramp at an output connected to a load capacitor when a DC voltage is applied to an input, comprising:

an input having a positive and negative lead connected to a DC power supply;

an output having a positive and negative lead connected to a load capacitor;

a PFET connected between the positive lead of the input and output;

a direct connection between the negative lead of the input and output;

a first capacitor connected between a gate of the PFET and the positive output lead;

a transistor connected between the gate of the PFET and the positive input lead for charging the first capacitor when the DC power supply applies a DC voltage to the input;

a voltage divider connected between the positive and negative leads and having a center tap coupled to the gate of the PFET for setting the steady state gate potential thereof; and an RC circuit connected to a base of the transistor and the positive and negative input lead for tuning off the transistor at a certain time after the DC voltage is applied to the input.

2. The inrush current control circuit of claim 1 further comprising a second resistor connected between the gate of the PFET and the negative input lead for providing a current path to discharge the first capacitor when the transistor is turned off.

3. The inrush circuit of claim 2 further comprising a first resistor connected in series to the first capacitor for suppressing oscillations in the PFET.

4. The inrush circuit of claim 2 further comprising a third resistor connected between the positive input lead and the gate of the PFET, wherein the second and third resistor form a voltage divider that sets a steady state gate potential of the PFET.

5. In a power distribution network having a plurality of systems, each system having a capacitive load, connected to a common power supply, a separate inrush current control circuit connected between each system and the common power supply, each inrush current control circuit comprising:

an input having a positive and negative lead connected to the common power supply;

an output having a positive and negative lead connected to one of the plurality of systems;

a PFET connected between the positive lead of the input and output;

a direct connection between the negative lead of the input and output;

a first capacitor connected between a gate of the PFET and the positive output lead;

a transistor connected between the gate of the PFET and the positive input lead for charging the first capacitor when the common power supply applies a DC voltage to the input;

an RC circuit connected to a base of the transistor and the positive and negative input lead for turning off the transistor at a certain time after the DC voltage is applied to the input; and a voltage divider connected between the positive and negative leads and having a center tap coupled to the gate of the PFET and a collector of the transistor for setting the steady state gate potential of the PFET.

6. The inrush circuit of claim 1 wherein the voltage divider further comprises a pair of resistors coupled together at a collector of the transistor and the gate of the PFET, wherein a first of the pair of resistors has a second terminal thereof coupled to the positive lead and a second of the pair of resistors has a second terminal thereof coupled to the negative lead.

* * * * *